Nov. 24, 1942.　　F. W. GEHRKE　　2,303,208
VIEW FINDER
Filed Dec. 10, 1940

Friedrich Wilhelm Gehrke
INVENTOR.
BY Philip S. Hopkins
William C. Babcock
HIS ATTORNEYS Patented Nov. 24, 1942

2,303,208

UNITED STATES PATENT OFFICE 2,303,208

VIEW FINDER

Friedrich Wilhelm Gehrke, Munich, Germany, assignor to General Aniline & Film Corporation, New York, N. Y., a corporation of Delaware Application December 10, 1940, Serial No. 369,468
In Germany November 30, 1939

3 Claims. (Cl. 88—1.5)

My present invention relates to a novel view finder device and more particularly to a direct vision finder as used on motion picture cameras.

It is a known fact that when photographing a near object the image seen in the view finder does not correspond with the resulting photograph, since the optical axis of the taking lens is not in alinement with that of the finder. This phenomenon is called parallax. Various devices are used to correct this parallax. It has, for instance, been proposed to arrange in front of the view finder objective a mask which can be displaced more or less according to the focal adjustment of the camera. There are furthermore devices in which one of the view finder lenses, the front or the back lens, has been rendered displaceable. All these known improvements, however, cannot be effected without changing the camera constructionally. Moreover, in using masks there is the disadvantage that the image field of the finder is limited.

The present invention has as an object to overcome the disadvantages mentioned above.

Another object is to provide an additional lens for the parallax adjustment.

Still another object is to provide an improved direct vision finder.

Further objects of my invention will be seen from the description following hereinafter.

Figure 1:
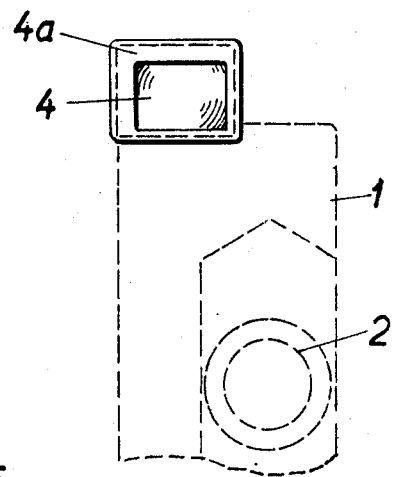
Figure 2:
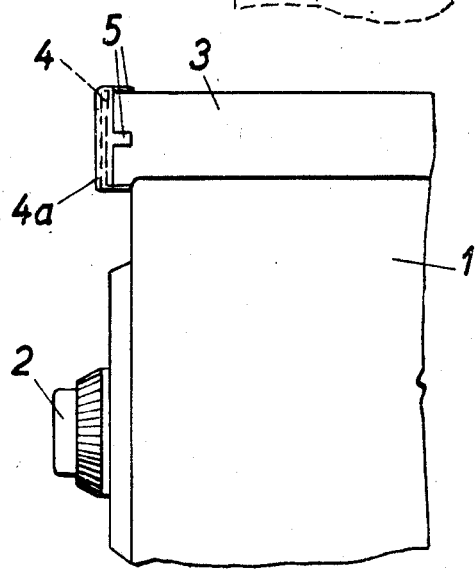

Reference is made to the accompanying drawing which illustrates the invention:

Figure 1 is a front view of the upper part of a motion picture camera with a finder and an additional lens and Figure 2 is a side view of the camera shown in Figure 1.

The objects of my present invention are accomplished in using a direct vision finder which includes an eyepiece consisting of a positive lens and an objective consisting of a negative lens by removing parallax with the aid of an additional negative lens which is placed in front of the finder objective. By this additional lens the angle of image of the finder objective is magnified so that a larger virtual image is obtained. In order to reduce the size of this image to that of the image seen through the camera objective, the frame of the additional lens is formed as a mask adapted to limit the image and, moreover, mounted eccentrically with respect to the normal image seen in the finder so as to avoid parallax. Accordingly, it is possible to observe the object to be photographed without limitation of the image field and without parallax. The additional lens is attachable to the finder objective by claws or the like.

In the drawing, numeral 1 designates a motion picture camera housing equipped with a photograpic objective 2, a direct vision finder 3 as mentioned above and a negative lens 4. This lens 4 put on the finder objective is secured in centric position by claws 5. 4a designates a frame for the lens 4. The axis of the frame 4a, however, does not coincide with the optical axis of the fixed finder 3, since the center of the frame is displaced towards the camera objective 2. Owing to the negative lens 4 and the eccentric arrangement of the frame 4a the image field obtains the normal size and the parallax is corrected for a certain distance of the object to be photographed. Instead of the claws 5 other means may be used which are adapted to secure the additional lens 4.

A camera equipped with such an additional lens is especially suitable for photographing titles, writings, documents and the like which are placed in a certain very short distance from the objective.

As many apparently widely different embodiments of my invention may be made without departing from the spirit and scope thereof, it is to be understood that I do not limit myself to the specific embodiments thereof except as defined in the appended claims.

I claim:

1. A photographic camera including, in combination, a picture-taking objective lens, a fixed direct vision finder having a positive eyepiece lens and a negative objective lens, an additional negative lens, a masking frame, and means for securing said additional negative lens and masking frame directly to said finder and in front of said negative finder objective, said additional negative lens enlarging the angular field of view of the finder, and said frame having an opening whose axis is displaced from the optical axis of the finder toward the axis of said picture-taking objective for masking off unsymmetrical edge portions of said enlarged finder field.

2. A parallax correction attachment for a camera which has a picture-taking objective lens and an axially separated direct vision finder having a positive eyepiece lens and a negative objective lens, said attachment including an additional negative lens, a masking frame and means for securing said additional negative lens and frame directly to said finder in front of said negative finder objective, said additional negative lens enlarging the angular field of view of the finder, and said frame having an opening whose axis is displaced from the optical axis of said finder toward the axis of said picture-taking objective for masking off the unsymmetrical edge portions of said enlarged finder field which are outside the angular field of the picture-taking objective at a given distance.

3. A parallax correction attachment for a camera which has an objective lens and an axially separated direct vision finder, said attachment including a negative lens, a masking frame and means for securing said negative lens and frame directly to said finder, said negative lens enlarging the angular field of view of the finder, and said frame having an opening whose axis is displaced from the optical axis of said finder toward the axis of said objective for masking off unsymmetrical edge portions of said enlarged finder field to correct for parallax at a given object distance.

FRIEDRICH WILHELM GEHRKE.